United States Patent [19]
Kawai

[11] Patent Number: 4,720,169
[45] Date of Patent: Jan. 19, 1988

[54] LENS FOR MACRO-PHOTOGRAPHY

[75] Inventor: Tohru Kawai, Kanagawa, Japan

[73] Assignee: Canon Kabushiki Kaisha, Japan

[21] Appl. No.: 739,380

[22] Filed: May 30, 1985

[30] Foreign Application Priority Data

Jun. 7, 1984 [JP] Japan ............................ 59-083605[U]

[51] Int. Cl.⁴ ........................... G02B 7/02; G02B 7/04
[52] U.S. Cl. .................................... 350/255; 350/252
[58] Field of Search ....................... 350/252, 255, 257; 354/286

[56] References Cited
U.S. PATENT DOCUMENTS

| 2,381,228 | 8/1945 | Schmidt | 350/255 |
| 2,800,052 | 7/1957 | Bechtold et al. | 354/286 |
| 2,853,925 | 9/1958 | Lee | 350/252 |
| 3,544,199 | 12/1970 | Prochnow | 354/286 |
| 4,003,068 | 1/1977 | Hashimoto . | |
| 4,175,831 | 11/1979 | Ito . | |

Primary Examiner—William H. Punter
Attorney, Agent, or Firm—Toren, McGeady & Associates

[57] ABSTRACT

A lens is provided with first and second coupling means which are arranged at both ends of the lens barrel of the lens in the direction of the optical axis thereof so that the lens can be turned round and mounted in a reversed posture on a camera to permit macro-photography.

8 Claims, 5 Drawing Figures

LENS FOR MACRO-PHOTOGRAPHY

BACKGROUND OF THE INVENTION

1. Field of the Invention

This invention relates to a lens that permits a camera to be used for macro-photography by mounting it on the camera in the reverse direction.

2. Description of the Prior Art

Increasing the photographic magnification of a lens for macro-photography has involved shifting the lens to a close-up position nearer than the closest distance of the normal distance range of the lens.

For such macro-photography, the lens barrels of prior art lenses have been arranged, for example, as disclosed in the specification of U.S. Pat. No. 4,175,831. According to that patent, a movable lens is divided into a number of lenses and one of them is movable forward into a macro-photography zone.

In order to increase the magnification of a lens up to an actual size or a conformal magnification value, it has been necessary to extend the lens to a value equal to the focal length of the lens. This has now raised various problems including an increased outside diameter of the lens for preventing light flux from being eclipsed, and increases both in dimensions and weight resulting from lengthened multiplex structure of the lens barrel.

To solve these problems, one known arrangement limits the extension of the lens to one-half of its focal length to reduce the size of the lens barrel and to obtain magnifications up to a conformal magnification value. This is done by extending the lens to a distance corresponding to the other half focal length with an intermediate ring whose length is ½ of the focal length and is interposed in between the lens barrel and a camera body. An example of this arrangement is disclosed in U.S. Pat. No. 4,003,068. However, in such an arrangement the intermediate ring is totally unnecessary for photography within a range from infinity to a 0.5 magnification point or thereabout. Yet it is inconvenient to stow the immediate ring when the ring is not in use. Besides, the intermediate ring increases in the cost of the lens.

SUMMARY OF THE INVENTION

An object of the invention is to provide a compact, light and cheap lens for macro-photography which eliminates the shortcomings of the prior art lenses and is capable of permitting photography at magnification ratios up to a conformal magnification ratio by limiting the extension of the lens to one-half of the focal length thereof and without requiring use of an intermediate ring.

The above and further objects and features of the invention will become apparent from the following detailed description of a preferred embodiment thereof taken in connection with the accompanying drawings.

DETAILED DESCRIPTION OF THE PREFERRED EMBODIMENT

Figure 1A:
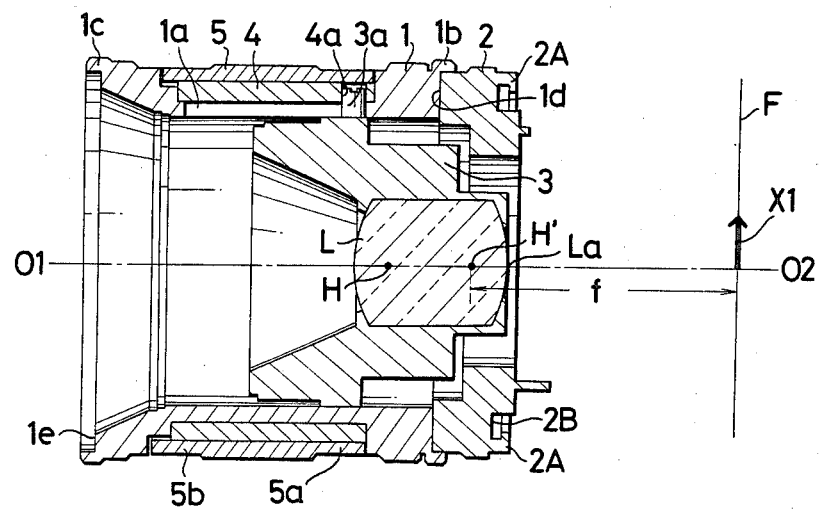
FIGS. 1A and 1B are sectional views of a lens barrel in its different normal focused states, FIG. 1A showing it in the infinity position and FIG. 1B as in its nearest close-up position.
Figure 1B:
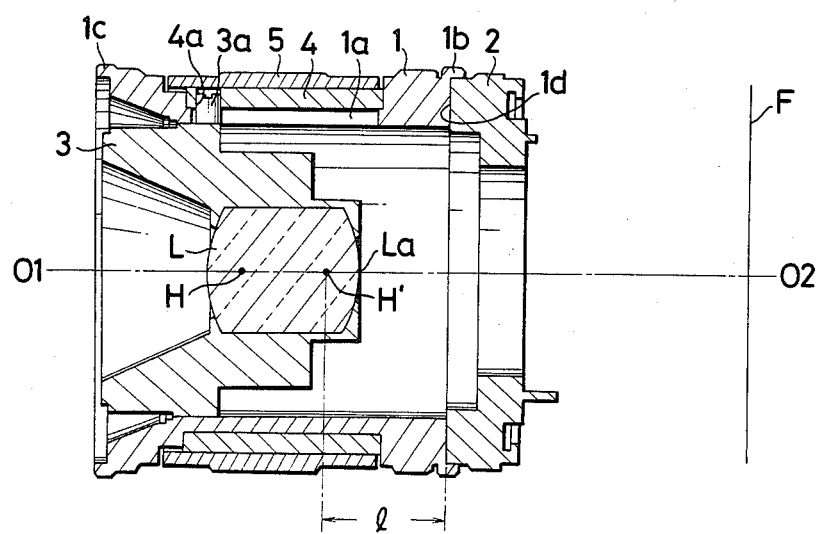

FIGS. 1A and 1B show a lens barrel arranged according to this invention. A stationary tube 1 is provided with a guide slot 1a; and first and second coupling means 1b and 1c. The first and second coupling means 1b and 1c at both ends of the stationary tube 1 in the direction of the optical axis are connectable with a connection tube 2 which is arranged to be connected to a camera which is not shown. The first coupling means 1b is provided with a datum face 1d which is used in mounting the lens barrel on the camera by the first coupling means 1b and the second coupling means 1c with a datum face 1e which is to be used in mounting the lens barrel on the camera by the second coupling means.

A movable tube 3 is arranged to carry a photo-taking lens L and is fitted into the stationary tube 1. The connection tube 2 is provided with coupling means 2A which is to be used for coupling with the camera and a mounting datum face 2B.

A turnable tube 4 is fitted on the outside of the stationary tube 1 and has its movement in the direction of the optical axis restricted. The turnable tube 4 is provided with a cam slot 4a which is arranged to intersect the guide slot 1a of the stationary tube 1. A cam follower 3a is secured to the outer circumference of the movable tube 3 and is arranged to engage the guide slot 1a and the cam slot 4a at their intersection point. An operation tube 5 is located on the outside of the turnable tube 4 and is coupled with the latter. The photo-taking lens L has a photo-taking optical axis O1-O2. A reference symbol F denotes an image plane located within the camera. A symbol H denotes a front principal point and another symbol H' a rear principal point of the photo-taking lens L. The stationary tube 1, the turnable tube 4 and the operation tube 5 jointly form a lens barrel body as shown in FIG. 1A. A lens barrel consists of the above-stated lens barrel body and the connection tube 2.

In the condition as shown in FIG. 1A, the photo-taking lens L is focused on an object located at an infinity distance with the lens L shifted to the side of the camera. FIG. 1B shows the photo-taking lens L as in a state of having been shifted to the nearest distance position thereof. The operation tube 5, the turnable tube 4 and the guide slots 1a and 4a which constitute means for shifting the photo-taking lens L are arranged such that, in focusing the photo-taking lens L on a photo-taking object located at the nearest photographable distance as shown in FIG. 1B, the lens L is shifted to an extent which is one half of the focal length f thereof. In other words, the photographing magnification ratio of the photo-taking lens L is 0.5.

Figure 2:
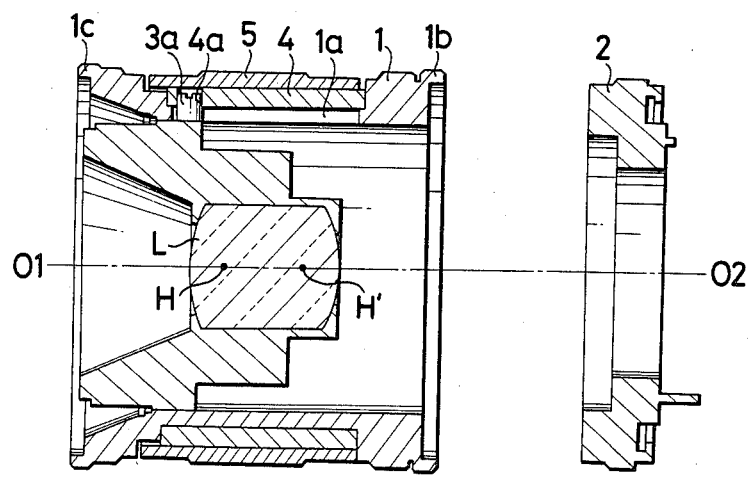
FIG. 2 is a sectional view of the same lens barrel showing it with its body disconnected from a connection tube.

For macro-photography, the embodiment is arranged to operate as follows: In FIG. 2, with the photo-taking lens kept in the nearest distance position, the first coupling means 1b of the lens barrel body is disconnected from the coupling means of the connection tube 2. The lens barrel body is turned round into a reversed posture. Then, the second coupling means 1c of the lens barrel body is coupled with the coupling means of the connection tube 2 as shown in FIG. 3A.

If the lens L is in the nearest distance position as shown in FIG. 1B, a distance l between the rear principal point H' of the photo-taking lens L and the mounting datum face 1d for mounting the lens barrel body on the connection tube 2 is equal to a distance l obtained between the front principal point H of the lens L and the mounting datum face 1e with the lens barrel body mounted in a reversed posture on the connection tube. Therefore, the front and rear principal points H and H' of the photo-taking lens L have their positions interchanged between positions obtained before the reversed mounting and positions obtained after the reversed mounting.

Figure 3A:
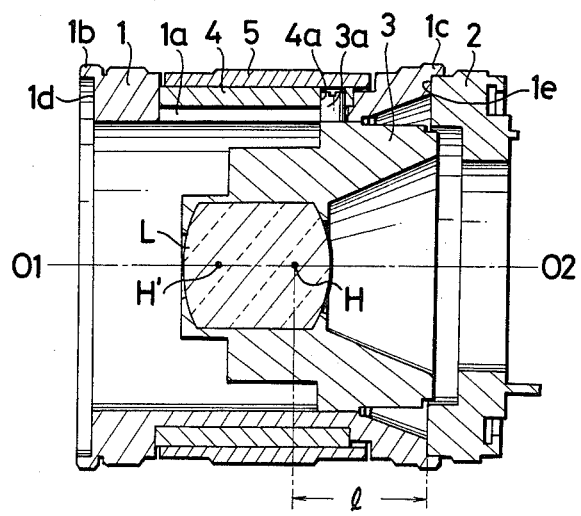
FIGS. 3A and 3B are sectional views of the same lens disconnected from the connection tube in the state of FIG. 1B and then connected in a reverse direction to the connected tube, FIG. 3A showing it as focused on infinity and FIG. 3B showing it in its nearest distance position.
Figure 3B:
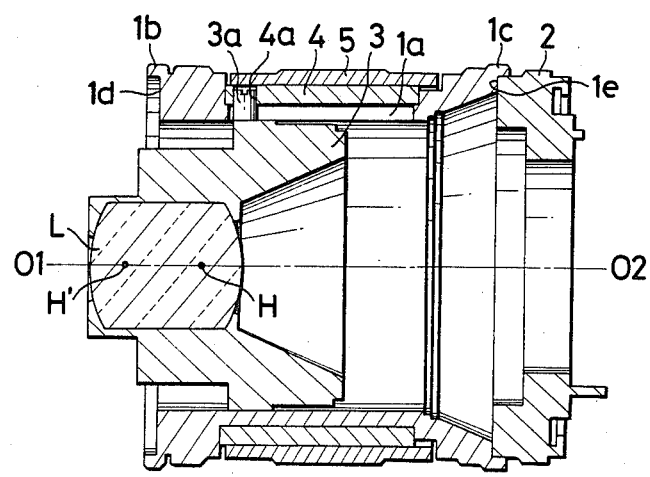

With the lens barrel body having been turned round and mounted backward as shown in FIG. 3A, the photo-taking lens L is located closer to the camera. Under this condition, when the operation tube 5 is rotated, the guide slot 1a guides the photo-taking lens L toward a photo-taking object into a position as shown in FIG. 3B. The shifted extent of the photo-taking lens L from the position thereof shown in FIG. 3A to the position shown in FIG. 3B is about one half of the focal length f of the lens L. Therefore, the total shifted extent of the photo-taking lens L from its position shown in FIG. 1A to its position shown in FIG. 3B becomes equal to the focal length of the photo-taking lens L. The image of the object is thus magnified to a size equal to the actual size of the object.

The rotating operations of the embodiment described above for shifting the lens in normal focusing and in macro-photography are as follows: The lens barrel is designed to have the operation member 5 rotated clockwise as viewed from the rear surface of the lens located on the side of the camera in shifting the lens from the infinity distance position of FIG. 1A to the near distance position of FIG. 1B. In the event of macro-photography, the lens barrel is turned round and mounted in a reversed posture on the camera for macro-photography as shown in FIG. 3A. When the operation member is rotated clockwise with the lens L in the position of FIG. 3A, the lens L moves to the macro-photography position thereof which is as shown in FIG. 3B. Therefore, the rotating direction of the operation member 5 when the lens is within the normal focusing zone remains unchanged within the macro-photography zone.

DISPLAY OF MACRO-PHOTOGRAPHY MAGNIFICATION

The stationary tube 1 is provided with a distance index fixedly carved therein to show distances within a zone for normal focusing which is from the position of FIG. 1A to the position of FIG. 1B. An inifinity distance mark "∞" and distance graduations 10, 5, 3, —and 0.5 (m) are provided at one end 5a on the outer circumference of the operation member 5. Meanwhile, for the macro-photography, distance graduations and magnification marks are provided on the other end 5b on the outer circumference of the operation member 5. The letters and symbols to be used for the macro-photography display are arranged in the order reverse to the order in which the letters and symbols are arranged for normal focusing.

In accordance with this invention, as described above, the lens barrel can be mounted in a reversed posture to permit macro-photography as well as a normal focus photo-graphing operation. Macro-photographing operations can be performed at magnification ratios up to a conformal magnification ratio without recourse to an intermediate ring.

Referring again to FIG. 1A, with the rear surface La of the photo-taking lens L arranged to be closer to the camera than the mounting face of the lens barrel body for mounting it on the connection tube 2, at least a portion of the photo-taking lens L comes to protrude to the outside from the lens barrel body as shown in FIG. 3B when the lens barrel body is mounted in a reversed posture for macro-photography. By virtue of this protruding arrangement, nothing blocks an illumination light flux between the photo-taking lens and the photo-taking object. Therefore, light can be adequately taken in for macro-photography.

In the embodiment described, arrangement to make the shiftable extent of the photo-taking lens more than one half of the focal length of the lens enables the macro-photography magnification to be increased even up to a ratio higher than the conformal magnification ratio. Further a modification example of the embodiment of this invention is arranged as follows: The lens barrel body and the connection tube of the embodiment shown in FIG. 1A are formed in one unified body. The whole lens barrel of FIG. 1A is arranged to be turned round and to be mounted on the camera (not shown) by means of the second coupling means 1c. In this manner, the modification can be arranged to have the two principal points kept unchanged under both the normal focus photographing condition and the backward mounting macro-photography condition. Therefore, a macro-photographing operation can be performed in the same manner as in the case of the embodiment described in the foregoing.

What is claimed is:

1. A lens for macro-photography, mounted on a camera body, comprising:
a lens barrel body including a photo-taking lens and means for shifting said lens, said shifting means including a shifting construction which enables said lens to move along an optical axis thereof;
a connection tube arranged to be interposed between said lens barrel body and said camera body; and
first and second coupling means arranged at both ends of the optical axis of said lens barrel body,
wherein a position of a rear principle point of said photo-taking lens, when said lens is shifted to a nearest distance position by said shifting means with said lens barrel body being connected to said connection tube by said first coupling means, coincides with a position of a rear principle point of said photo-taking lens, when said lens is maintained at said nearest distance position by said shifting means and said lens barrel body is connected to said connection tube by said second coupling means.

2. A lens for macro-photography according to claim 1, wherein a connection plane between said lens barrel body and said connection tube is located closer to an object to be photographed than the rear surface of said photo-taking lens.

3. A lens for macro-photography, comprising:
a lens arranged to perform a focusing action;
first and second coupling means arranged on both ends of an optical axis of said lens to be coupled with coupling means disposed on a camera; and
lens shifting means for shifting said lens to an extent which is one half of the focal length of said lens,
a position of the rear principle point of said lens obtained when said lens is shifted to a nearest distance position with said lens mounted on said camera by said first coupling means being arranged to coincide with a position of a rear principle point of said lens obtained with said lens mounted in reverse on said camera by said second coupling means.

4. A lens for macro-photography according to claim 1, wherein, for normal photography, said lens barrel body is connected to said connection tube by said first coupling means, and for macro-photography, said lens barrel body is connected to said connection tube by said second coupling means.

5. A lens for macro-photography according to claim 1, wherein said shifting means comprises:
said lens barrel body being formed with an axial guide slot therein;
a turnable tube fitted outside of said lens barrel body and having a cam slot form on an inner surface thereof, said cam slot intersecting with said guide slot;
means for restricting movement of said turnable tube along the optical axis;
a movable tube for carrying said photo-taking lens; and
a cam follower secured on an outer surface of said movable tube and arranged to engage said guide slot and said cam slot at a point where said slots intersect, whereby when said turnable tube is turned, said intersecting point moves along said guide slot causing said cam follower and said movable tube carrying said photo-taking lens to move along the optical axis.

6. A lens for macro-photography according to claim 3, wherein, for normal photography, said lens is mounted on said camera by said first coupling means, and for macro-photography, said lens is mounted in reverse on said camera by said second coupling means.

7. A lens for macro-photography according to claim 3, wherein said lens further comprises:
a stationary tube for containing said focusing lens, said coupling means being arranged at opposite ends of said stationary tube; and
a movable tube for carrying said focusing lens, said movable tube being arrange within said stationary tube and shiftable along the optical axis by said shifting means.

8. A lens for macro-photography according to claim 7, wherein said shifting means comprises:
said stationary tube being formed with a guide slot along the optical axis;
a turntable tube fitted outside of said stationary tube and having a cam slot formed on an inner surface thereof, said cam slot intersecting with said guide slot;
means for restricting movement of said turnable tube along the optical axis; and
a cam follower secured on an inner surface of said movable tube and arranged to engage said guide slot and said cam slot at a point where said slots intersect, whereby when said turnable tube is turned, said intersecting point moves along said guide slot causing said cam follower and said movable tube carrying said focusing lens to move along the optical axis.

* * * * *